United States Patent
Luo et al.

(10) Patent No.: US 8,206,537 B2
(45) Date of Patent: Jun. 26, 2012

(54) METHOD FOR FORMING A CONDUCTING MULTI-POLYMER NANOSTRUCTURE

(75) Inventors: Yi Luo, Pittsburgh, PA (US); Yixuan Chen, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 630 days.

(21) Appl. No.: 12/199,721

(22) Filed: Aug. 27, 2008

(65) Prior Publication Data

US 2010/0051186 A1  Mar. 4, 2010

(51) Int. Cl.
*B44C 1/17* (2006.01)
(52) U.S. Cl. .......................... 156/235; 156/230
(58) Field of Classification Search ................. 156/235, 156/230; 977/700
See application file for complete search history.

(56) References Cited

U.S. PATENT DOCUMENTS

| | | |
|---|---|---|
| 7,125,653 B2 | 10/2006 | Elian |
| 7,144,949 B2 | 12/2006 | Kaner et al. |
| 7,226,530 B2 | 6/2007 | Weiller et al. |
| 7,229,868 B2 | 6/2007 | Bernds et al. |
| 7,326,380 B2 | 2/2008 | Mirkin et al. |
| 7,332,369 B2 | 2/2008 | Veres et al. |
| 7,344,912 B1 | 3/2008 | Okoronyanwu |
| 7,351,357 B2 | 4/2008 | Blanchet-Fincher et al. |
| 2006/0035164 A1* | 2/2006 | Schaper .................. 430/200 |

FOREIGN PATENT DOCUMENTS

CN  1807492  7/2006

OTHER PUBLICATIONS

Michael Woodson, et al., "Guided Growth of Nanoscale Conducting Polymer Structures on Surface-Functionalized Nanopatterns", J. Am. Chem. Soc., 128, 3760-3763 (2006).
Beh, et al., "Formation of Patterned Microstructures of Conducting Polymers by Soft Lithography, and Applications in Microelectronic Device Fabrication", Adv. Mater. 11, No. 12, 1038-1041 (1999).
Wang, et al., "Electrochemically Fabricated Polyaniline Nanoframework Electrode Junctions that Function as Resistive Sensors", Nano Letters vol. 4, No. 9, 1693-1697 (2004).
Wang, et al., "Electrochemical Fabrication of Conducting Polymer Nanowires in an Integrated Microfluidic System", Chem. Commun., 3075-2077 (2006).
Jérôme, et al., "Electrochemical Synthesis of Polypyrrole Nanowires", Agnew. Chem. Int. Ed. vol. 37, No. 18, 2488-2490 (1998).
Delvaux, et al., "Chemical and Electrochemical Synthesis of Polyaniline Micro- and Nano-Tubules", Synthetic Metals vol. 113, 275-280 (2000).
Yun, et al, "Electrochemically Grown Wires for Individually Addressable Sensor Arrays", Nano Letters, vol. 4, No. 3, 419-422 (2004).

(Continued)

*Primary Examiner* — Yogendra Gupta
*Assistant Examiner* — John Robitaille
(74) *Attorney, Agent, or Firm* — Reed Smith LLP

(57) ABSTRACT

A method for forming a conducting multi-polymer nanostructure. The method includes forming a first conducting polymer nanostructure on a first electrode of a template, forming a second conducting polymer nanostructure on a second electrode of the template, and transferring the first and second conducting polymer nanostructures onto a substrate. The first conducting polymer is different from the second conducting polymer.

35 Claims, 16 Drawing Sheets

OTHER PUBLICATIONS

Woodson, et al., "Guided Growth of Nanoscale Conducting Polymer Structures on Surface-Functionalized Nanopatterns", J. Am. Chem. Soc., vol. 128, 3760-3763 (2006).

Peng, et al., A "Grow-in-Place" Architecture and Methodology for Electrochemical Synthesis of Conducting Polymer Nanoribbon Device Arrays", Nano Letters, vol. 5, No. 3, 439-444 (2005).

Lim, et al., "Electrostatically Driven Dip-Pen Nanolithography of Conducting Polymers", Adv. Mater., vol. 14, No. 20, 1474-1477 (2002).

Su, et al., "Dip-Pen Nanopatterning of Photosensitive Conducting Polymer Using a Monomer Ink", Applied Physics Letters, vol. 84, No. 21, 4200-4202 (2004).

* cited by examiner

US 8,206,537 B2

METHOD FOR FORMING A CONDUCTING MULTI-POLYMER NANOSTRUCTURE

STATEMENT REGARDING FEDERALLY SPONSORED RESEARCH

This invention was made with United States Government support in the form of Grant No. FA9550-07-1-0245 from the United States Air Force. The United States Government may have certain rights in the invention.

BACKGROUND

This application discloses an invention which is related, generally and in various embodiments, to a method for forming a conducting multi-polymer nanostructure.

In comparison to conventional semiconductors and/or conductive metals, conducting polymers have unique chemical, physical and electrical properties. In many applications, conducting polymers are being utilized in lieu of conventional semiconductors and/or conductive metals. Examples of such applications include electronics, optoelectronics, microelectromechanical systems (MEMS), chemical sensing, etc.

For devices having relatively large conducting polymer structures (e.g., micrometer and above), such structures are typically fabricated with inkjet printing techniques, mesh printing techniques, etc. However, such techniques are not effective for fabricating relatively small conducting polymer structures (e.g., on the nanometer level).

With a synthetic chemistry technique, conducting polymers have been fabricated on the nanometer level. However, the resultant conducting polymers are typically configured in a random arrangement which resembles a ball of tangled string. Due to the random arrangement, it is extremely difficult to place the individual "strands" in specific locations to form an ordered useful nanostructure.

In general, the above-described techniques, as well as other known fabrication techniques such as scanning probe based lithography, growth in an anodic aluminum template, etc., have not been found suitable for fabricating a conducting multi-polymer nanostructure which has a deterministic structure.

SUMMARY

In one general respect, this application discloses a method for forming a conducting multi-polymer nanostructure. According to various embodiments, the method includes forming a first conducting polymer nanostructure on a first electrode of a template, forming a second conducting polymer nanostructure on a second electrode of the template, and transferring the first and second conducting polymer nanostructures onto a substrate. The first conducting polymer is different from the second conducting polymer.

BRIEF DESCRIPTION OF THE DRAWINGS

Various embodiments of the invention are described herein in by way of example in conjunction with the following figures, wherein like reference characters designate the same or similar elements.

DETAILED DESCRIPTION

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

Figure 1:
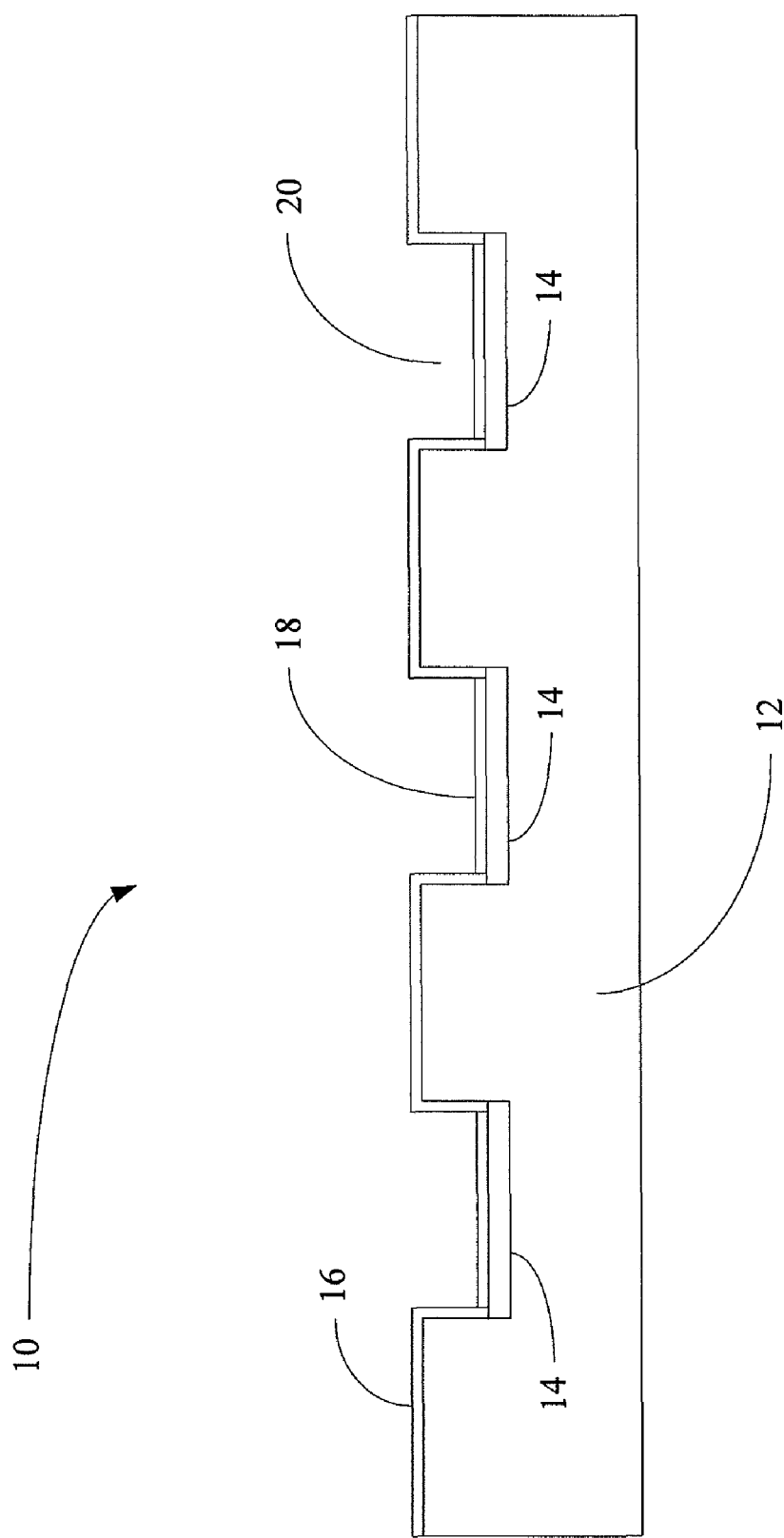
FIG. 1 illustrates various embodiments of a template.

FIG. 1 illustrates various embodiments of a template 10 which may be utilized to form a conducting multi-polymer nanostructure. The template includes a substrate 12, a plurality of electrodes 14 connected to the substrate 12, a layer 16 of a first material on a surface of the substrate 12, and a layer 18 of a second material on a surface of each electrode 14.

The substrate 12 may be fabricated from any suitable non-conductive material. For example, the substrate 12 may be fabricated from silicone oxide ($SiO_2$) on silicone (Si), silicone oxide ($SiO_2$), etc. The substrate 12 defines a plurality of openings 20, and each individual opening 20 may be of any suitable size and shape. For example, each individual opening 20 may be rectangular shaped, cylindrically shaped, etc. The substrate 12 may define any number of such openings 20. For purposes of simplicity, only three openings 20 are shown in FIG. 1. However, it is understood that the substrate 12 may define fewer than three openings 20 (e.g., two openings), three openings 20, or more than three openings 20 (e.g., four electrodes, five electrodes, six electrodes, seven electrodes, etc.).

The electrodes 14 may be fabricated from any suitable conductive material. For example, the electrodes 14 may be fabricated from platinum (Pt), from gold (Au), etc. The individual electrodes 14 are generally connected to the substrate 12 at the "bottom" of the respective openings 20 as shown in FIG. 1, and may be connected to the substrate 12 in any suitable manner. For example, the electrodes 14 may be adhered to the substrate 12, bonded to the substrate 12, etc. The template 10 may include any number of electrodes 14 connected to the substrate 12. For purposes of simplicity, only three electrodes 14 are shown in FIG. 1. However, it is understood that the template 10 may include fewer than three electrodes 14 (e.g., two electrodes), three electrodes 14, or more than three electrodes 14 (e.g., four electrodes, five electrodes, six electrodes, seven electrodes, etc.).

The first material may be applied to the template 10 in any suitable manner. For example, vapor deposition may be utilized to apply the first material to the template 10. When the first material is applied to the template 10, the first material reacts chemically with the substrate 12 to form the layer 16, and the formed layer 16 includes a non-stick surface. The first material does not react chemically with the electrodes 14. The first material may be any suitable material which reacts chemically with the substrate 12 to form a non-stick surface. For example, the first material may be fluoroalkane silane. After the formation of the layer 16, any remaining first material which has not reacted with the substrate 12 is removed. The remaining first material may be removed in any suitable manner. For example, the remaining first material may be pumped away, rinsed away, etc.

The second material may be applied to the template 10 in any suitable manner. For example, vapor deposition may be utilized to apply the second material to the template 10. When the second material is applied to the template 10, the second material reacts chemically with the electrodes 14 to form the layer 18, and the formed layer 18 includes as a non-stick surface. The second material does not react chemically with the layer 16. The second material may be any suitable material which reacts chemically with the electrodes 14 to form a non-stick surface, but does not react with the layer 16. For example, the second material may be fluoroalkanethiol. After the formation of the layer 18, any remaining second material which has not reacted with the electrodes 14 is removed. The remaining second material may be removed in any suitable manner. For example, the remaining second material may be pumped away, rinsed away, etc.

Figure 2:
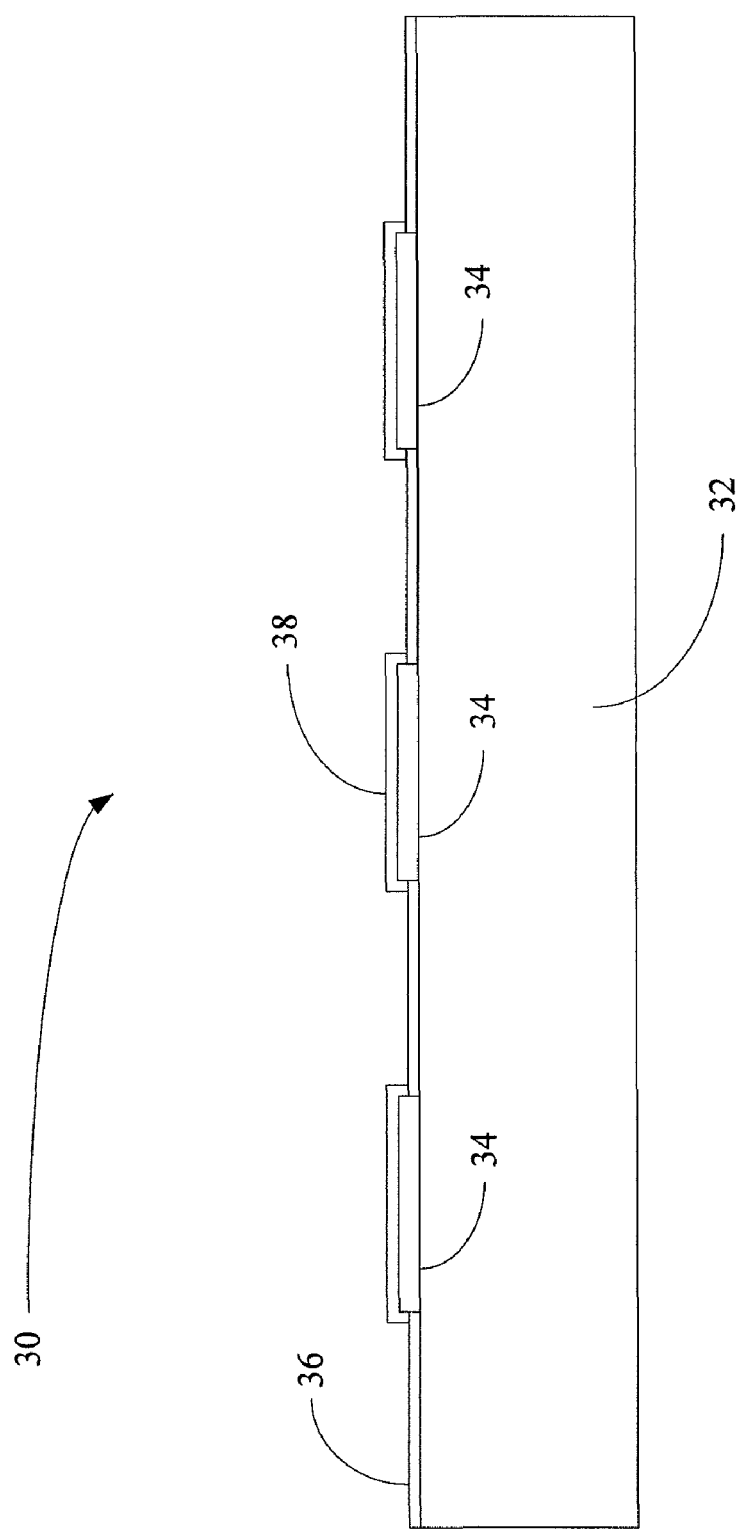
FIG. 2 illustrates various embodiments of another template.

FIG. 2 illustrates other embodiments of a template 30 which may be utilized to form a conducting multi-polymer nanostructure. The template 30 includes a substrate 32, a plurality of electrodes 34 connected to the substrate 32, a layer 36 of a first material on a surface of the substrate 32, and a layer 38 of a second material on a surface of each electrode 24. The template 30 is similar to the template 10 of FIG. 1, but is different in that the "uppermost" surface of the substrate 32 is substantially planar (i.e., it does not define openings similar to the openings 20 of FIG. 1) and the electrodes 32 are connected to the "uppermost" surface of the substrate 32.

Figure 3:
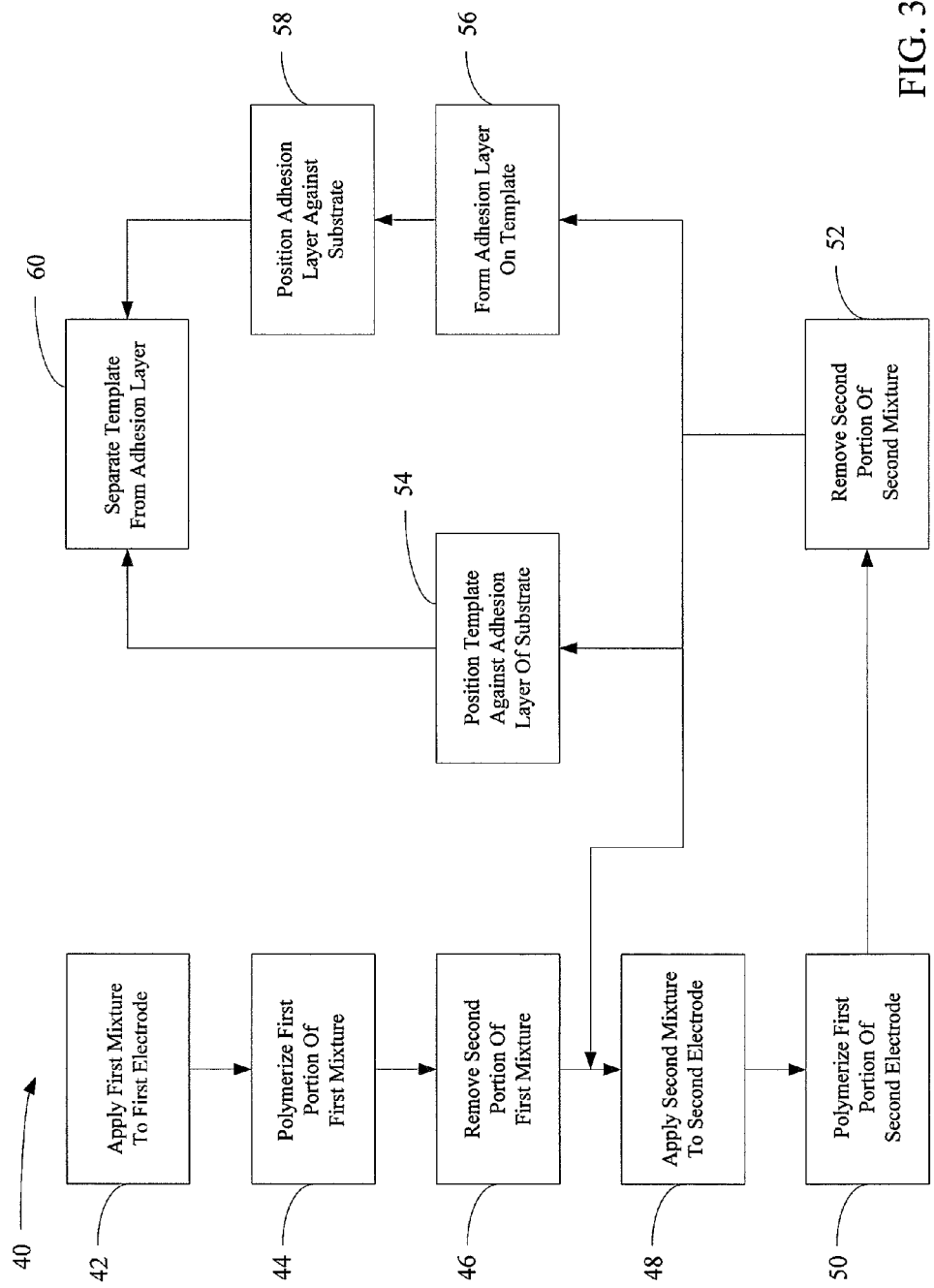
FIG. 3 illustrates various embodiments of a method for forming a conducting multi-polymer nanostructure.

FIG. 3 illustrates various embodiments of a method 40 for forming a conducting multi-polymer nanostructure. The formed nanostructure may include any number of different conducting polymer nanostructures, and each conducting polymer nanostructure may be formed in a deterministic shape, configuration, pattern, etc. In general, the method 40 includes forming a first conducting polymer nanostructure on a first electrode of a template, forming a second conducting polymer nanostructure on a second electrode of the template, and transferring the first and second conducting polymer nanostructures onto a substrate. For purposes of simplicity, although any number of different templates may be utilized to assist in the formation of the conducting multi-polymer nanostructure, the method 40 will be described in the context of utilizing the template 10 of FIG. 1 to assist in the formation of the conducting multi-polymer nanostructure.

Figure 4:
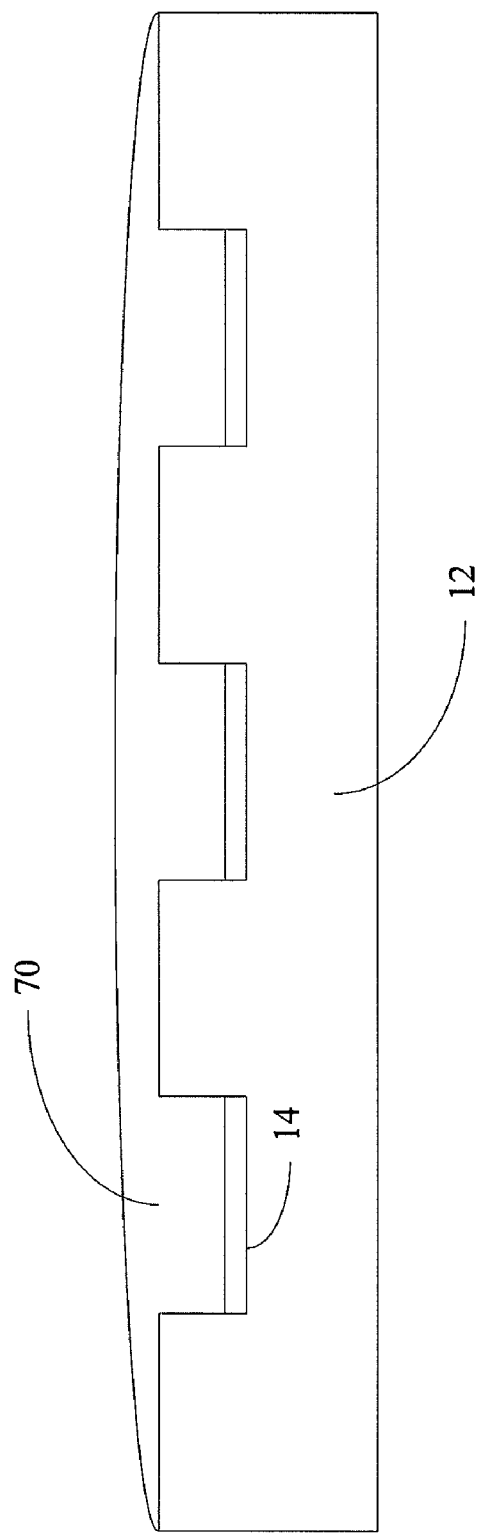
FIGS. 4-16 illustrate a conducting multi-polymer nanostructure at various stages of its formation.

The process 40 starts at block 42, where a first electrode 14 (e.g., the "leftmost" electrode) of the template 10 is covered with a first fluidic mixture 70. An example of the template 10 after the first electrode 14 is covered with the first fluidic mixture 70 is shown in FIG. 4. For purposes of simplicity, the layers 16, 18 of the template 10 are not shown in FIG. 4. When the first electrode 14 is covered with the first fluidic mixture 70, the first fluidic mixture 70 may also cover the other electrodes 14 of the template 10, as well as the "sidewalls" of the openings 20 and the "uppermost" surface of the substrate 12 of the template 10. The first fluidic mixture 70 includes a first monomer, a first electrolyte, and a first solvent. According to various embodiments, the first monomer can comprise approximately 5%-95% of the first fluidic mixture 70, the first electrolyte can comprise approximately 0.1% to 10% of the first fluidic mixture 70, and the first solvent can comprise approximately 2% to 95% of the first fluidic mixture 70.

The first fluidic mixture 70 may be applied to the first electrode 14 in any suitable manner. For example, the first fluidic mixture 70 may be applied by drops, by spraying, etc. The first monomer may be any suitable monomer, and may be in any suitable form (e.g., solid, liquid, etc.). The first electrolyte may be any suitable electrolyte. For example, depending on the first monomer, the first electrolyte may be a salt (e.g., $LiClO_4$, $PF_6^-$, etc.), an acid, etc. The first solvent may be any suitable solvent. For example, depending on the first monomer and the first electrolyte, the first solvent may be a water, an acetone, an alcohol, etc.

Figure 5:
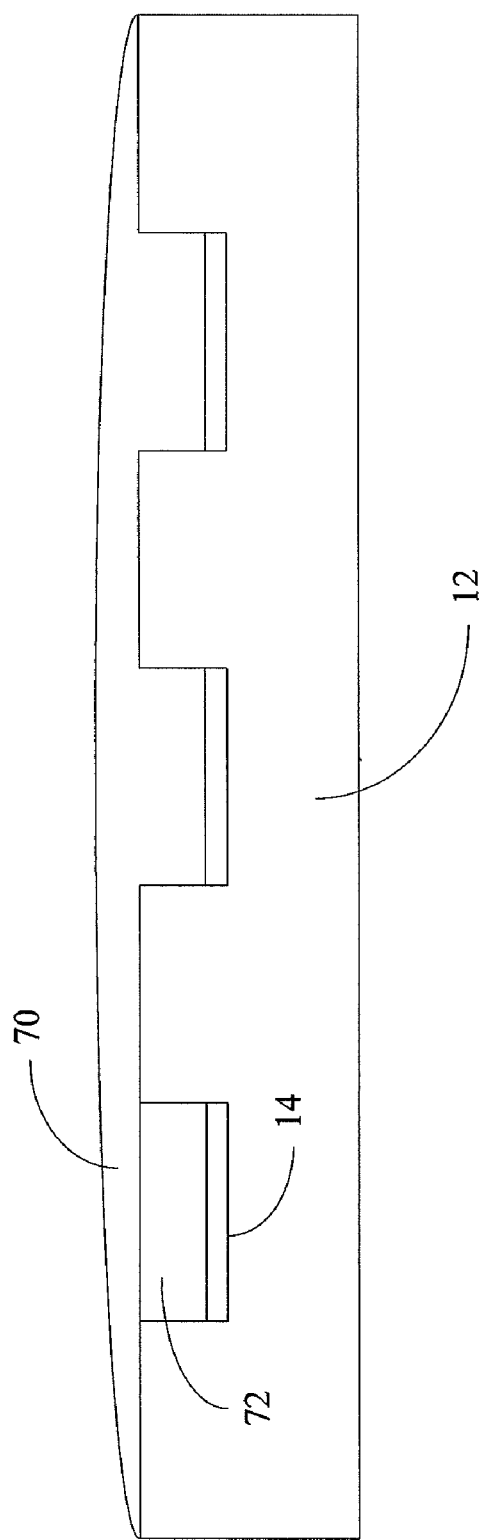

From block 42, the process advances to block 44, where a first portion of the first monomer is polymerized to form the first conducting polymer 72 above the first electrode 14. An example of the template 10 after the formation of the first conducting polymer 72 is shown in FIG. 5. For purposes of simplicity, the layers 16, 18 of the template 10 are not shown in FIG. 5.

According to various embodiments, the first electrode 14 and the first fluidic mixture 70 may form portions of an electrical circuit, and the first portion of the first monomer is polymerized by applying a voltage across the first electrode 14. For such embodiments, when the voltage is applied across the first electrode 14, the first electrode 14 is placed at a positive potential relative to the first fluidic mixture 70. The positive potential causes an electron of a first molecule of the first monomer to jump from the first monomer to the first electrode 14, thereby oxidizing the first molecule of the first monomer. The positive potential also causes an electron of a second molecule of the first monomer to jump from the first monomer to the first electrode 14, thereby oxidizing the second molecule of the first monomer. The oxidation of the first and second molecules of the first monomer lead to a bond being formed between the first and second molecules of the first monomer (i.e., polymerization occurs) accompanied by the production of two hydrogen ions.

The jumping of electrons and the accompanying polymerization continues as long as current continues to pass through the first fluidic mixture 70. The voltage is applied until the resultant first conducting polymer 72 fills the opening 20 above the first electrode 14 to a pre-determined height (e.g., to the "uppermost" surface of the substrate 12, to the "uppermost" surface of the layer 16, etc.). The voltage can be disconnected after a pre-determined period of time (the time it generally takes the resultant first conducting polymer 72 to fill the opening 20 to the predetermined height), after an observation that the resultant first conducting polymer 72 has filled the opening 20 to the predetermined height, etc. In general, for embodiments where the first electrolyte is a salt, the higher the percentage of salt in the first fluidic mixture 70, the first conducting polymer 72 is formed more quickly and is more conductive.

Figure 6:
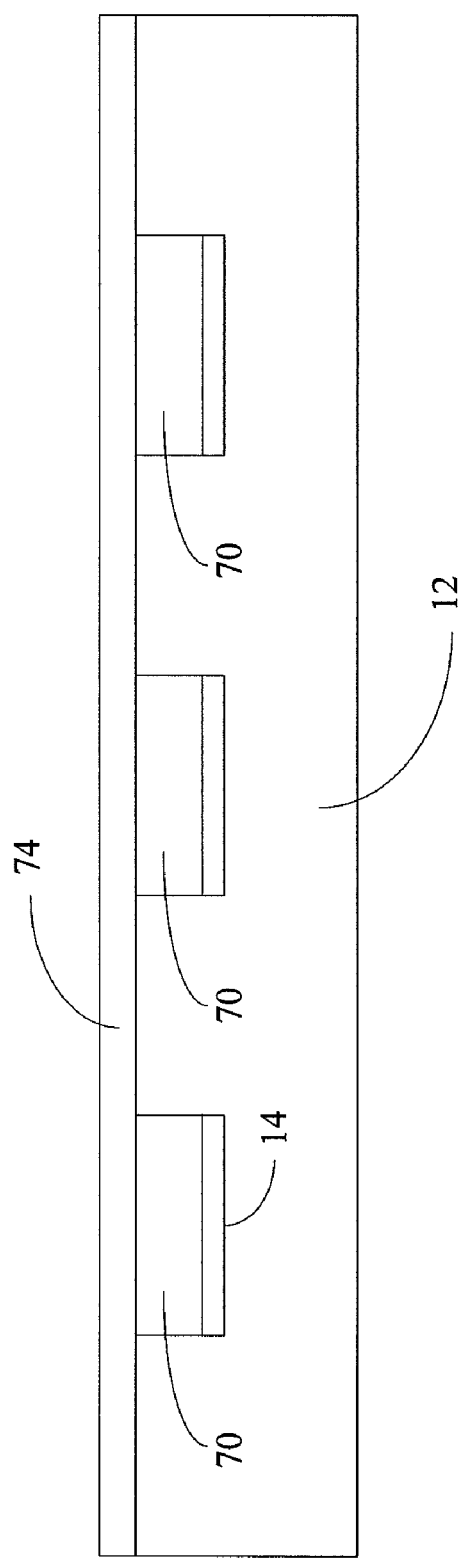

According to other embodiments, prior to the application of the voltage across the first electrode 14, a first barrier 74 is positioned over the "uppermost" surface of the template 10 to enclose the openings 20. An example of the first barrier 74 positioned over the "uppermost" surface of the template 10 is shown in FIG. 6. For purposes of simplicity, the layers 16, 18 of the template 10 are not shown in FIG. 6. The first barrier 74 may be positioned over the "uppermost" surface of the template 10 in any suitable manner. When the first barrier 74 is positioned over the "uppermost" surface of the template 10, the first fluidic mixture 70 remains in the openings 20 but is forced off of the "uppermost" surface of the template 10.

Figure 7:
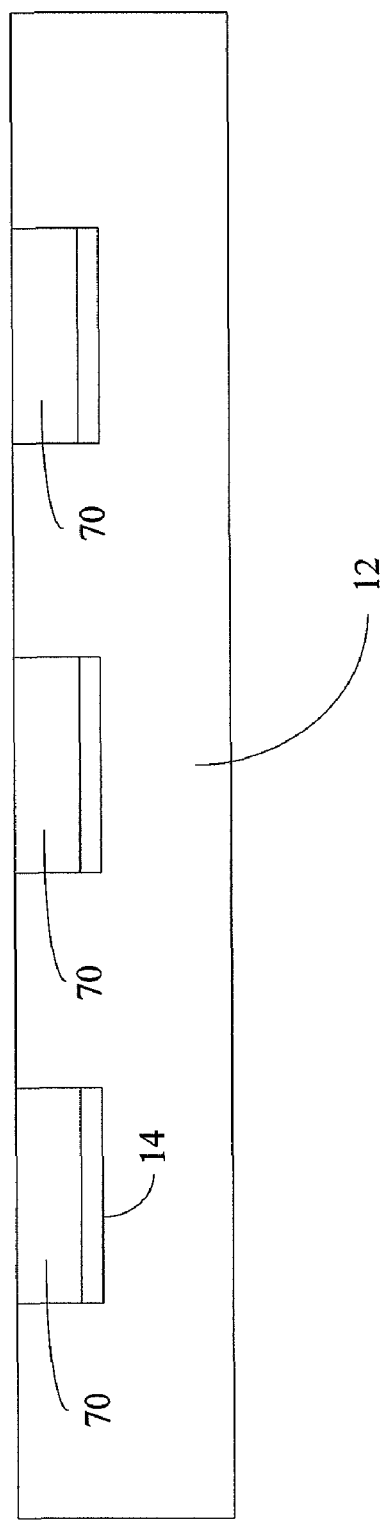

The first barrier 74 may be of any suitable material which does not react with the first fluidic mixture 70. For example, the first barrier 74 may be formed from polydimethylsiloxane, also known as PDMS. When the voltage is applied to the first electrode 14, the first barrier 74 operates to physically prevent the first conducting polymer 72 from growing above the "uppermost" surface of the template 10. After the first conducting polymer 72 has grown to fill the enclosed opening 20 above the first electrode 14, the voltage is disconnected, and the first barrier 74 is removed. An example of the first barrier 74 removed from the "uppermost" surface of the template 10 is shown in FIG. 7. For purposes of simplicity, the layers 16, 18 of the template 10 are not shown in FIG. 7.

Although the process described at block 44 is described in the context of forming the first conducting polymer 72 on a single electrode (i.e., on the first electrode 14), it is understood that the first conducting polymer 72 may be concurrently formed on one or more additional electrodes 14 of the template 10 by simply applying the above-described voltage across the additional electrodes 14. However, for purposes of simplicity, the description of the process 40 will proceed in the context of the first conducting polymer 72 only being formed on the first electrode 14.

Figure 8:
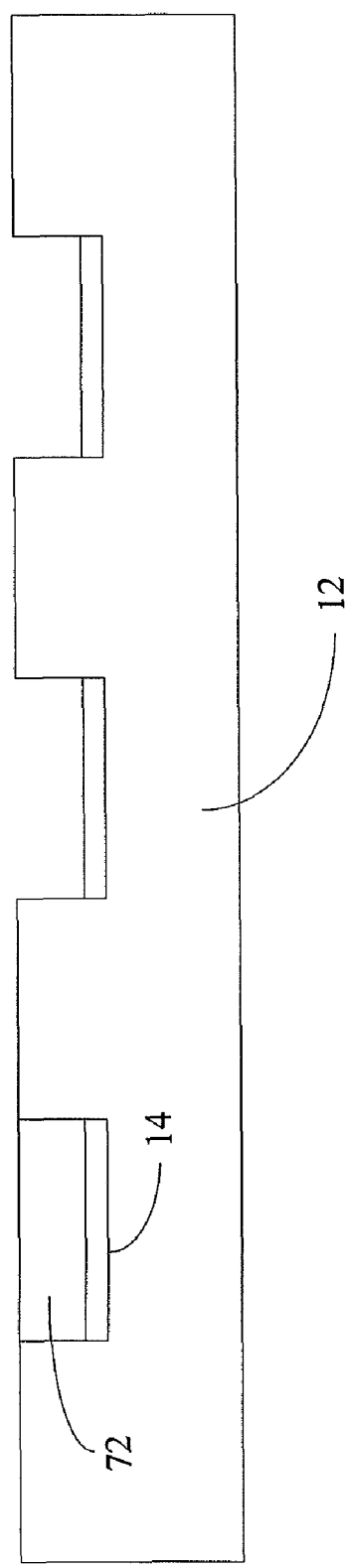

From block 44, the process advances to block 46, where a second portion of the first monomer is removed from the template 10. The removal of the second portion of the first monomer also includes the removal of any remaining portion of the first fluidic mixture 70 (i.e., any portion of the first fluidic mixture 70 which has not been polymerized). An example of the template 10 after the removal of the second portion of the first monomer is shown in FIG. 8. For purposes of simplicity, the layers 16, 18 of the template 10 are not shown in FIG. 8. The second portion of the first monomer may be removed in any suitable manner. For example, according to various embodiments, the second portion of the first monomer may be removed by rinsing the second portion from the template 10. The rinse may be realized in any suitable manner. For example, according to various embodiments, the rinse may be realized by dipping the template 10 into a solvent, by spraying the template 10 with a solvent, etc. The solvent may be any suitable solvent, as long as the strength of the solvent does not dissolve any of the first conducting polymer 72.

Figure 9:
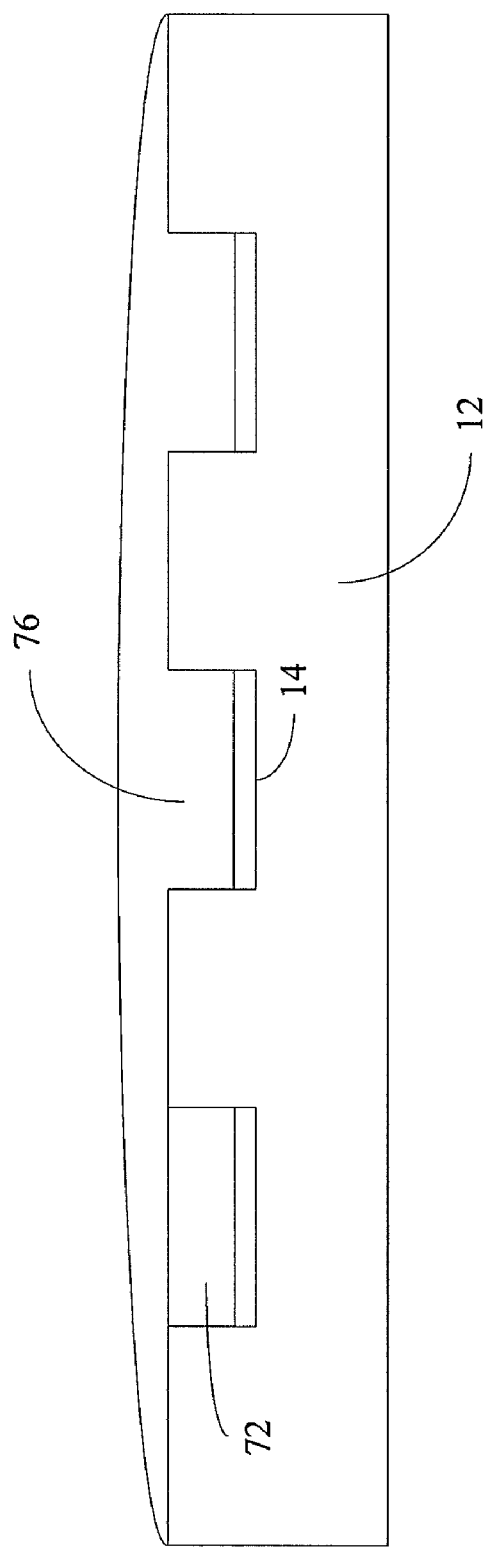

From block 46, the process advances to block 48, where a second electrode 14 (e.g., the electrode adjacent to the "leftmost" electrode) of the template 10 is covered with a second fluidic mixture 76. The second fluidic mixture 76 is different than the first fluidic mixture 70, and does not react with the first conducting polymer 72. An example of the template 10 after the second electrode 14 is covered with the second fluidic mixture 76 is shown in FIG. 9. For purposes of simplicity, the layers 16, 18 of the template 10 are not shown in FIG. 9. When the second electrode 14 is covered with the second fluidic mixture 76, the second fluidic mixture 76 may also cover the first conducting polymer 72, other electrodes 14 of the template 10 other than the first electrode 14 (e.g., the "rightmost" electrode), the "sidewalls" of openings 20 above the other electrodes 14, and the "uppermost" surface of the substrate 12 of the template 10. The second fluidic mixture 76 may be applied to the second electrode 14 in any suitable manner. For example, the second fluidic mixture 76 may be applied by drops, by spraying, etc.

The second fluidic mixture 76 includes a second monomer, a second electrolyte, and a second solvent. The second monomer may be any suitable monomer which is different than the first monomer, and may be in any suitable form (e.g., solid, liquid, etc.). The second electrolyte may be any suitable electrolyte. For example, depending on the second monomer, the second electrolyte may be a salt (e.g., $LiClO_4$, $PF_6^-$, etc.), an acid, etc. Thus, depending on the second monomer, the second electrolyte may be the same as or different than the first electrolyte. The second solvent may be any suitable solvent. For example, depending on the second monomer and the second electrolyte, the second solvent may be a water, an acetone, an alcohol, etc. Thus, depending on the second monomer and the second electrolyte, the second solvent may be the same as or different from the first solvent.

According to various embodiments, the second monomer can comprise approximately 5%-95% of the second fluidic mixture 76, the second electrolyte can comprise approximately 0.1% to 10% of the second fluidic mixture 76, and the second solvent can comprise approximately 2% to 95% of the second fluidic mixture 76.

Figure 10:
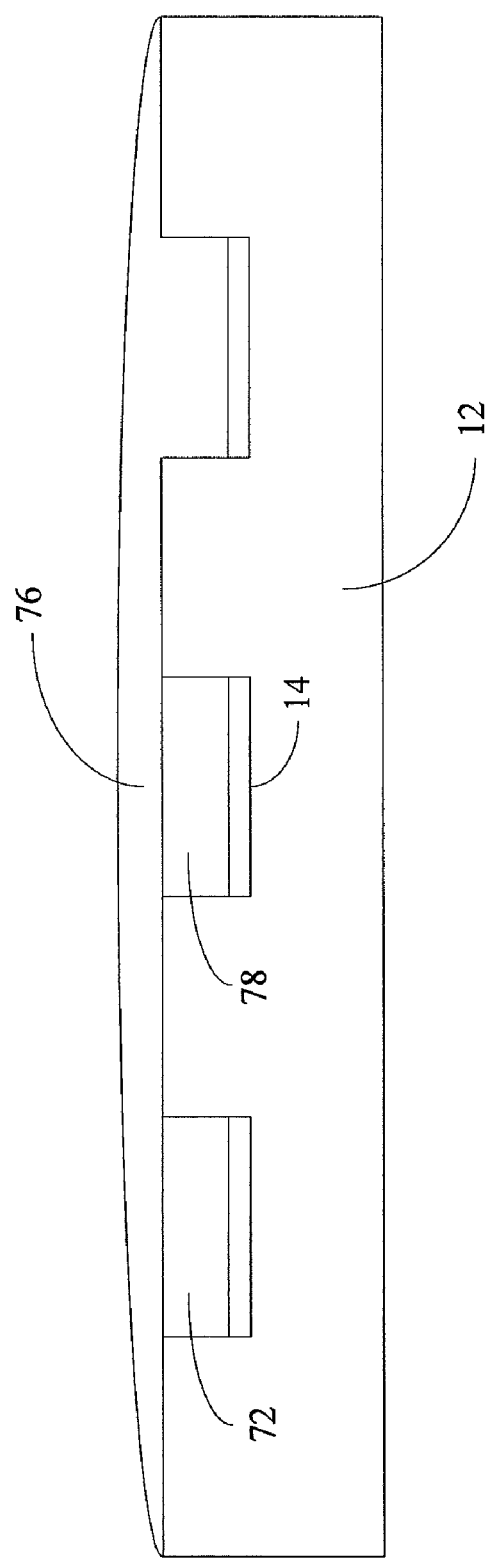

From block 48, the process advances to block 50, where a first portion of the second monomer is polymerized to form the second conducting polymer 78 above the second electrode 14. An example of the template 10 after the formation of the second conducting polymer 78 is shown in FIG. 10. For purposes of simplicity, the layers 16, 18 of the template 10 are not shown in FIG. 10. The second monomer may be polymerized in a manner which is similar to the manner in which the first monomer is polymerized. Thus, according to various embodiments, the second electrode 14 and the second fluidic mixture 76 may form portions of an electrical circuit, and the first portion of the second monomer is polymerized by applying a voltage across the second electrode 14. Additionally, according to various embodiments, prior to the application of the voltage across the second electrode 14, a second barrier is positioned over the "uppermost" surface of the template 10 to cover the first conducting polymer 72 and enclose the openings 20 which are filled with the second fluidic mixture 76. The second barrier may be the same as or different from the first barrier 74. After the second conducting polymer 78 has grown to fill the enclosed opening 20 above the second electrode 14, the voltage is disconnected, and the second barrier is removed.

Although the process described at block 50 is described in the context of forming the second conducting polymer 78 on a single electrode (i.e., on the second electrode 14), it is understood that the second conducting polymer 78 may be concurrently formed on one or more additional electrodes 14 which do not already have the first conducting polymer 72 formed thereon. The second conducting polymer 78 may be concurrently formed on such additional electrodes 14 of the template 10 by simply applying the above-described voltage across the additional electrodes 14. However, for purposes of simplicity, the description of the process 40 will proceed in the context of the second conducting polymer 78 only being formed on the second electrode 14.

Figure 11:
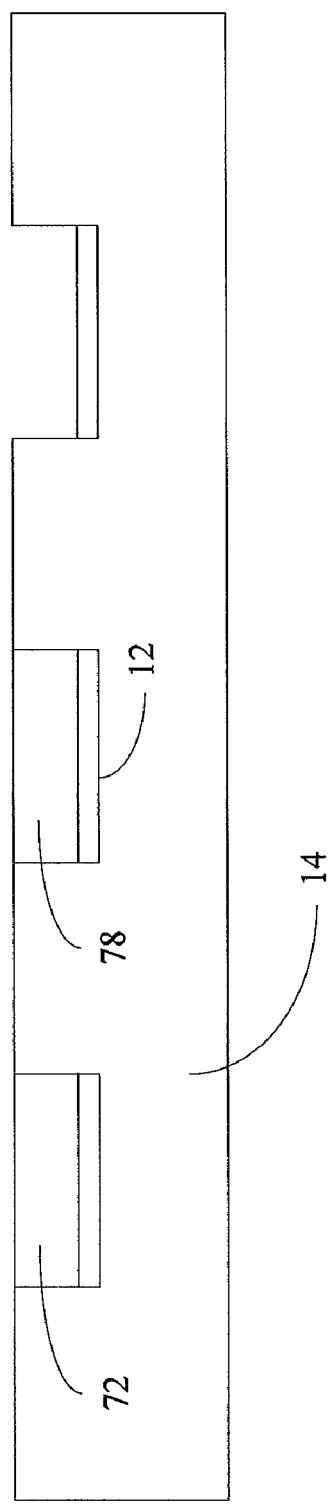

From block 50, the process advances to block 52, where a second portion of the second monomer is removed from the template 10. The removal of the second portion also includes the removal of any remaining portion of the second fluidic mixture 76 (i.e., any portion of the second fluidic mixture 76 which has not been polymerized). An example of the template 10 after the removal of the second portion of the second monomer is shown in FIG. 11. For purposes of simplicity, the layers 16, 18 of the template 10 are not shown in FIG. 11. The second portion of the second monomer may be removed in any suitable manner. Thus, the removal of the second portion of the second monomer may be realized in a manner which is similar to the manner in which the second portion of the first monomer was removed from the template 10.

Figure 12:
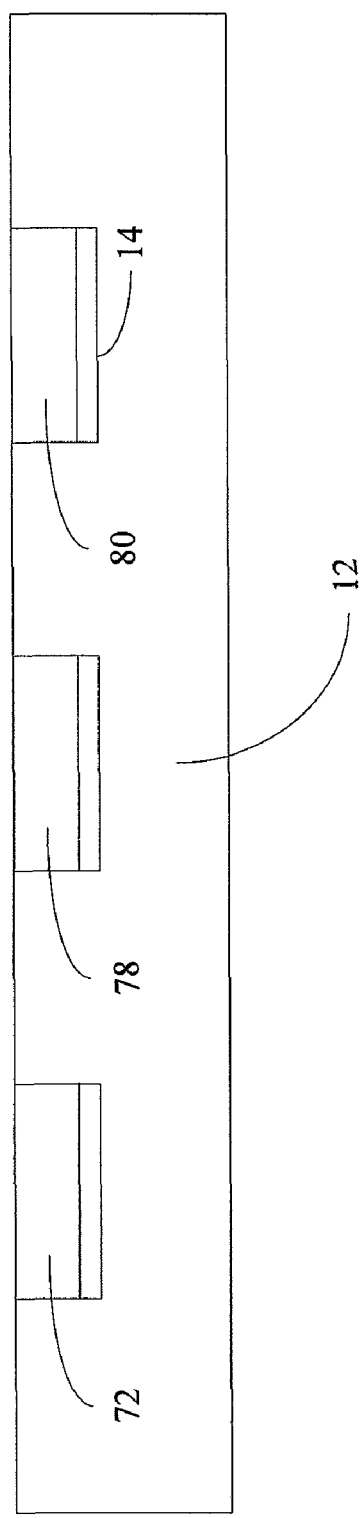

From block 52, the process may return to block 48, advance to block 54, or advance to block 56. If one or more additional different conductive polymer nanostructures are to be formed, the process returns to block 48, where the general process described at blocks 48-52 is repeated for each different fluidic mixture-electrode combination (e.g., a third fluidic mixture applied to a third electrode). The general process described at blocks 48-52 may be repeated any number of times. An example of the template 10 after the desired number of different conducting polymer nanostructures has been formed is shown in FIG. 12. For purposes of simplicity, the layers 16, 18 of the template 10 are not shown in FIG. 12. In FIG. 12, a third conducting polymer 80 is shown on the "rightmost" electrode 14.

Figure 13:
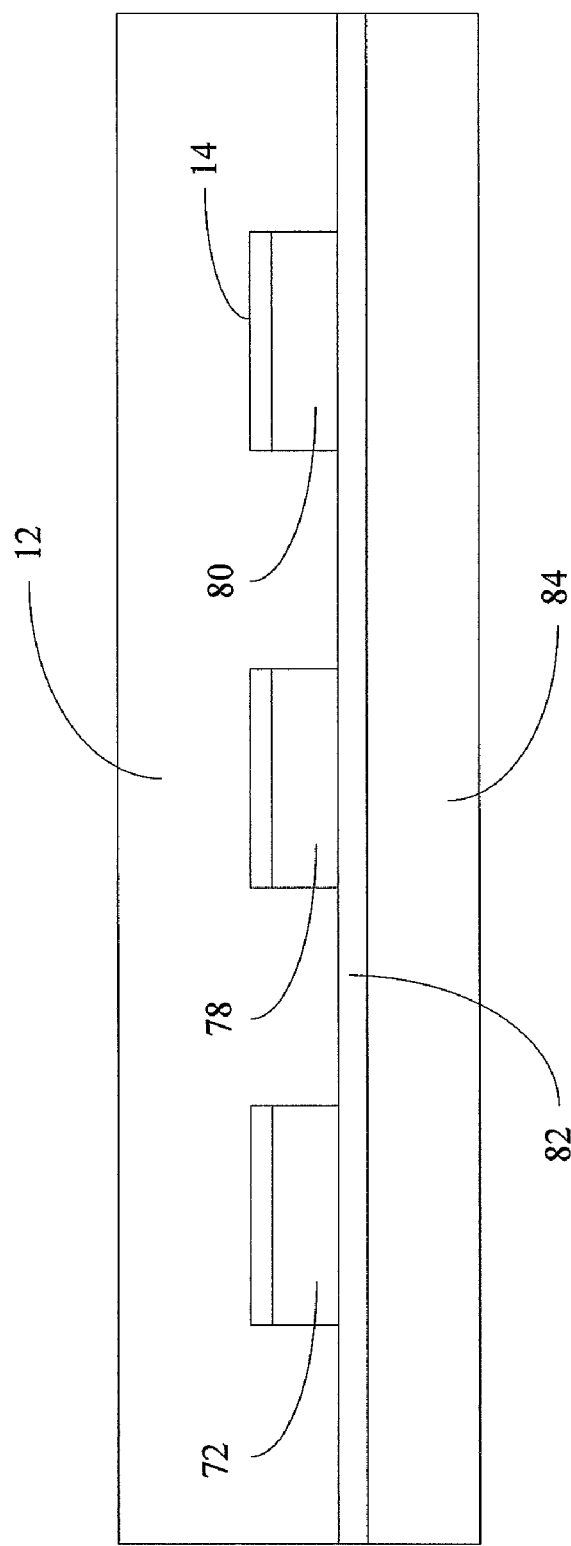

According to various embodiments, after the desired number of different conductive polymer nanostructures have been formed on the template 10, the process advances from block 52 to block 54. At block 54, the "uppermost" surface of the template 10 and the different conducting polymer nanostructures are positioned against an adhesion layer 82 formed on a substrate 84. The substrate 84 may be a flexible substrate or a rigid substrate. An example of the template 10 after its positioning against the adhesion layer 82 is shown in FIG. 13. For purposes of simplicity, the layers 16, 18 of the template 10 are not shown in FIG. 13, and each opening 20 is filled with a conducting polymer nanostructure. As shown in FIG. 13, the template 10 may be flipped prior to its positioning against the adhesion layer 82. The adhesion layer 82 may comprise any suitable material. For example, the adhesion layer 82 may comprise a thermo-curable resist or resin, a photo-curable resist or resin, an epoxy and a catalyzing agent, etc. The template 10 may be positioned against the adhesion layer 82 in any suitable manner, and any suitable amount of force may be applied to "press" the template 10 against the adhesion layer 82. From block 54, the process advances to block 60.

Figure 14:
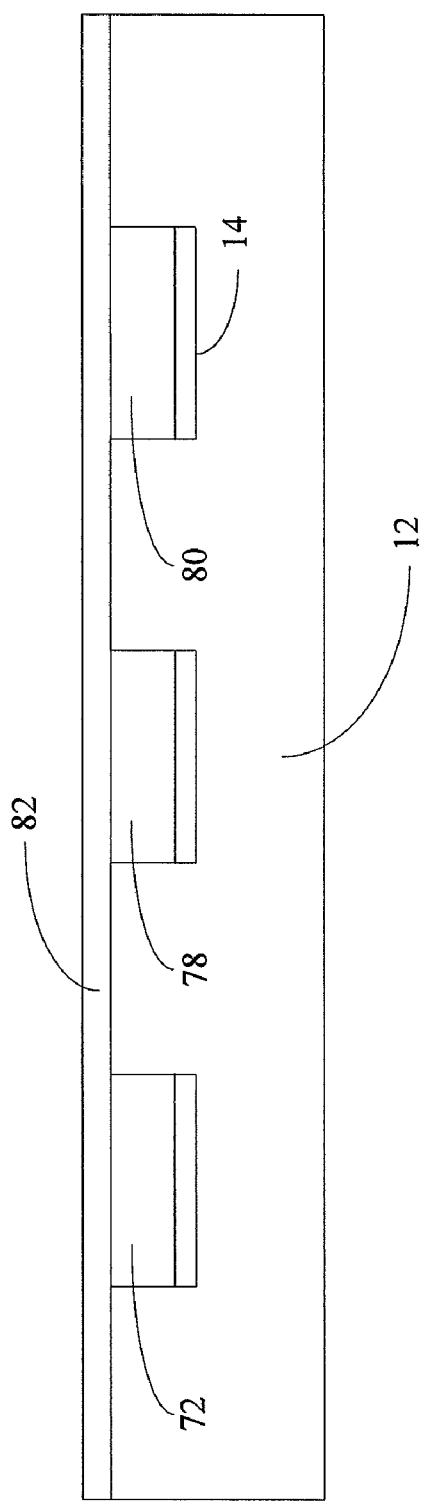

According to other embodiments, after the desired number of different conductive polymer nanostructures have been formed on the template 10, the process advances from block 52 to block 56. At block 56, the above-described adhesion layer 82 is formed on the "uppermost" surface of the template 10 and on the different conducting polymer nanostructures. An example of the template 10 after the formation of the adhesion layer 82 on the "uppermost" surface of the template 10 and on the different conducting polymer nanostructures is shown in FIG. 14. For purposes of simplicity, the layers 16, 18 of the template 10 are not shown in FIG. 14, and each opening 20 is filled with a conducting polymer nanostructure. The adhesion layer 82 may be formed in any suitable manner.

Figure 15:
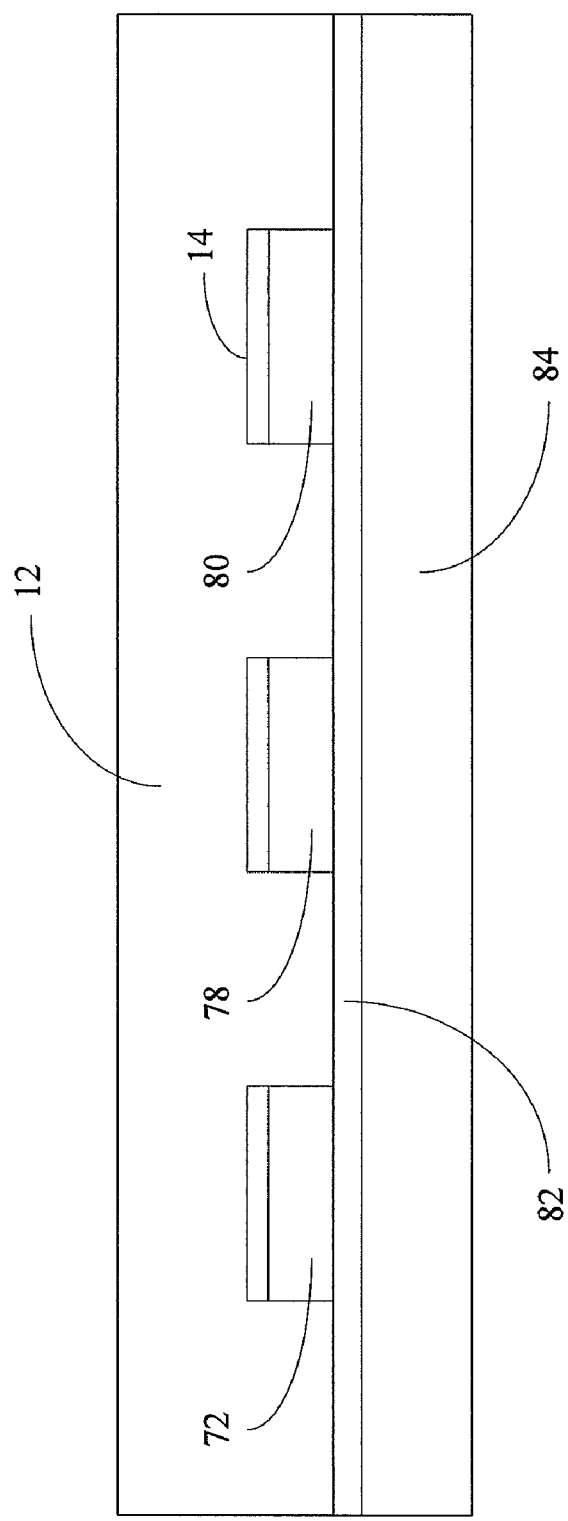

From block 56, the process advances to block 58, where the adhesion layer 82 formed on "uppermost" surface of the template 10 and on the different conducting polymer nanostructures is positioned against the above-described substrate 84. An example of the template 10 after the positioning of the adhesion layer 82 against the substrate 84 is shown in FIG. 15. For purposes of simplicity, the layers 16, 18 of the template 10 are not shown in FIG. 15, and each opening 20 is filled with a conducting polymer nanostructure. As shown in FIG. 15, the template 10 may be flipped prior to the positioning of the adhesion layer 82 against the substrate 84. The adhesion layer 82 may be positioned against the substrate 84 in any suitable manner, and any suitable amount of force may be applied to the template 10 to "press" the adhesion layer 82 against the substrate 84. From block 58, the process advances to block 60.

Figure 16:
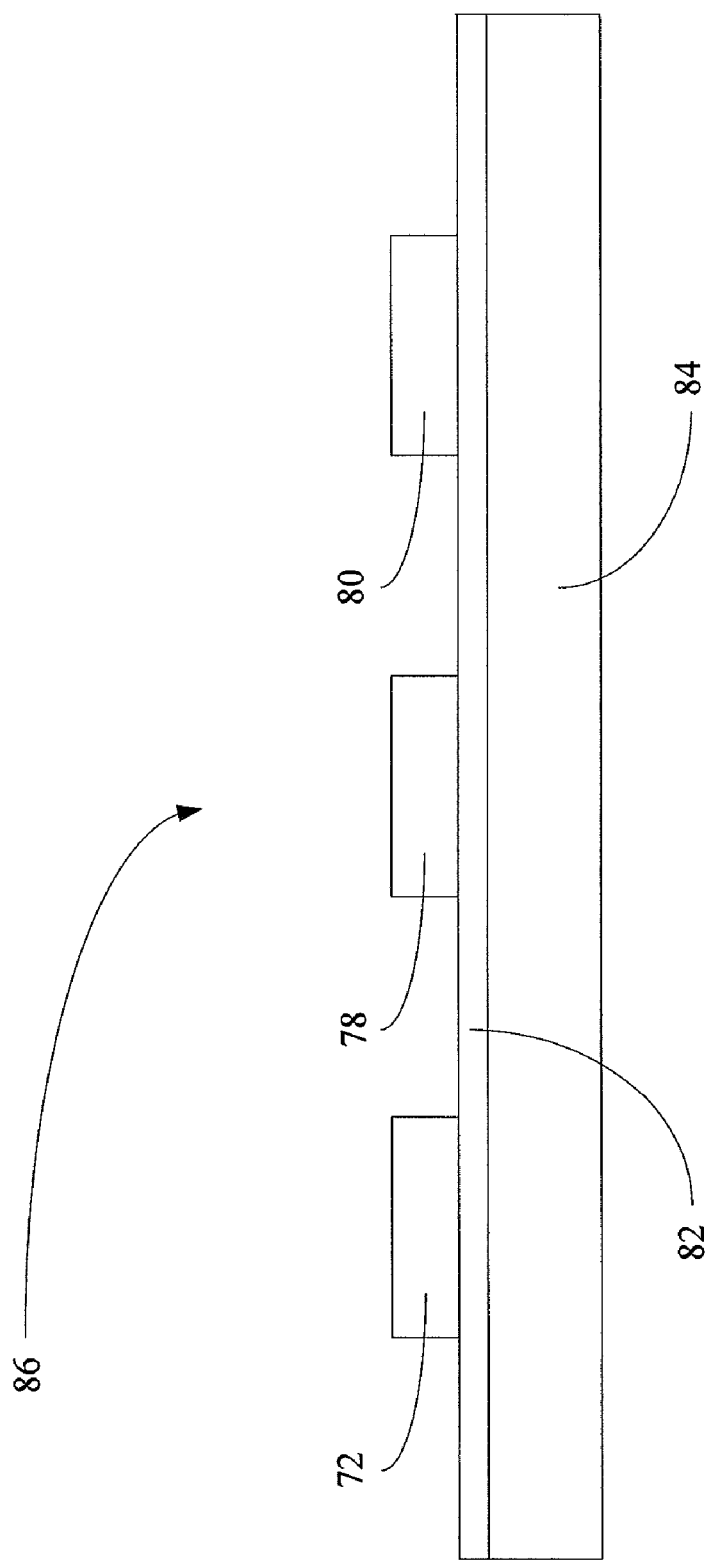

At block 60, the template 10 is separated from the adhesion layer 82 and from the different conducting polymer nanostructures. An example of the resultant conducting multi-polymer nanostructure 86 is shown in FIG. 16. Due to the first material (e.g., fluoroalkane silane) previously applied to the substrate 12 of the template 10, and the second material (e.g., fluoroalkanethiol) previously applied to the electrodes 14, the separation of the template 10 from the adhesion layer 82 and from conducting polymer nanostructures is more easily achieved.

According to various embodiments, prior to the separation of the template 10 from the adhesion layer 82 and from conducting polymer nanostructures, the adhesion layer 82 is cured. The adhesion layer 82 may be cured in any suitable manner. For embodiments where the adhesion layer 82 includes a thermo-curable resist or resin, the adhesion layer 82 may be cured by heating the adhesion layer 82, directly or indirectly. For embodiments where the adhesion layer 82 includes a photo-curable resist or resin, the adhesion layer 82 may be cured by applying light to the adhesion layer 82, directly or through a transparent substrate 84. For embodiments where the adhesion layer 82 includes an epoxy and a catalyzing agent, the adhesion layer 82 may self-cure over a period of time.

Nothing in the above description is meant to limit the invention to any specific materials, geometry, or orientation of elements. Many part/orientation substitutions are contemplated within the scope of the invention and will be apparent to those skilled in the art. The embodiments described herein were presented by way of example only and should not be used to limit the scope of the invention.

Although the invention has been described in terms of particular embodiments in this application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A method for patterning a conducting multi-polymer nanostructure, the method comprising:
   forming a deterministically shaped first conducting polymer nanostructure above a first electrode of a reusable template, wherein the shape of the formed first conducting polymer nanostructure is dependent upon a shape of the first electrode;
   forming a deterministically shaped second conducting polymer nanostructure above a second electrode of the template, wherein the shape of the formed second conducting polymer nanostructure is dependent upon a shape of the second electrode, and wherein the first conducting polymer is different from the second conducting polymer; and
   transferring the formed first and second conducting polymer nanostructures from the template onto a substrate.

2. The method of claim 1, wherein forming the first conducting polymer nanostructure comprises:
   covering the first electrode with a first mixture, wherein the first mixture comprises:
      a first monomer;
      a first electrolyte; and
      a first solvent;
   polymerizing a first portion of the first monomer; and
   removing a second portion of the first monomer after the polymerization of the first portion of the first monomer.

3. The method of claim 2, wherein polymerizing the first portion of the first monomer comprises applying a voltage across the first electrode.

4. The method of claim 3, wherein applying the voltage across the first electrode comprises applying the voltage for a pre-determined period of time.

5. The method of claim 3, wherein applying the voltage across the first electrode comprises applying the voltage until the first portion of the first monomer is polymerized at a pre-determined distance above the first electrode.

6. The method of claim 2, wherein removing the second portion of the first monomer comprises rinsing the second portion of the first monomer.

7. The method of claim 2, wherein covering the first electrode with the first mixture further comprises covering at least one of the following with the first mixture:
   the second electrode; and
   a surface of the template.

8. The method of claim 7, wherein removing the second portion of the first monomer further comprises removing the second portion of the first monomer from at least one of the following:
   the second electrode; and
   the surface of the template.

9. The method of claim 2, further comprising positioning a barrier at a pre-determined distance above the first electrode before polymerizing the first portion of the first monomer.

10. The method of claim 9, wherein positioning the barrier further comprises positioning the barrier on a surface of the template.

11. The method of claim 9, wherein polymerizing the first portion of the first monomer comprises applying a voltage across the first electrode until the first portion of the first monomer is polymerized at the pre-determined distance above the first electrode.

12. The method of claim 2, wherein forming the second conducting polymer nanostructures comprises:
covering the second electrode with a second mixture, wherein the second mixture comprises:
a second monomer, wherein the second monomer is different than the first fluidic monomer;
a second electrolyte; and
a second solvent;
polymerizing a first portion of the second monomer; and
removing a second portion of the second monomer after the polymerization of the first portion of the second monomer.

13. The method of claim 12, wherein polymerizing the first portion of the second monomer comprises applying a voltage across the second electrode.

14. The method of claim 13, wherein applying the voltage across the second electrode comprises applying the voltage for a pre-determined period of time.

15. The method of claim 13, wherein applying the voltage across the second electrode comprises applying the voltage until the first portion of the second monomer is polymerized at a pre-determined distance above the second electrode.

16. The method of claim 12, wherein removing the second portion of the second monomer comprises rinsing the second portion of the second monomer.

17. The method of claim 12, wherein covering the second electrode with the second mixture further comprises covering at least one of the following with the second mixture:
the first conducting polymer nanostructure; and
a surface of the template.

18. The method of claim 17, wherein removing the second portion of the second monomer further comprises removing the second portion of the second monomer from at least one of the following:
the first conducting polymer nanostructure; and
the surface of the template.

19. The method of claim 12, further comprising positioning a barrier at a pre-determined distance above the second electrode before polymerizing the first portion of the second monomer.

20. The method of claim 19, wherein positioning the barrier further comprises positioning the barrier on a surface of the template.

21. The method of claim 19, wherein polymerizing the first portion of the second fluidic monomer comprises applying a voltage across the second electrode until the first portion of the second monomer is polymerized at the pre-determined distance above the second electrode.

22. The method of claim 12, further comprising forming a third conducting polymer nanostructure on a third electrode of the template.

23. The method of claim 1, wherein transferring the first and second conducting polymer nanostructures comprises transferring the first and second conducting polymer nanostructures onto a flexible substrate.

24. The method of claim 1, wherein transferring the first and second conducting polymer nanostructures comprises transferring the first and second conducting polymer nanostructures onto a rigid substrate.

25. The method of claim 1, wherein transferring the first and second conducting polymer nanostructures onto the substrate comprises:
positioning an adhesion layer formed on the substrate against the following:
the first conducting nanostructure;
the second conducting nanostructure; and
a surface of the template; and
separating the template from the adhesion layer.

26. The method of claim 25, further comprising curing the adhesion layer before separating the template from the adhesion layer.

27. The method of claim 26, wherein curing the adhesion layer comprises heating the adhesion layer.

28. The method of claim 26, wherein curing the adhesion layer comprises applying light to the adhesion layer.

29. The method of claim 1, wherein transferring the first and second conducting polymer nanostructures onto the substrate comprises:
forming an adhesion layer on the following:
the first conducting nanostructure;
the second conducting nanostructure; and
a surface of the template; and
positioning the adhesion layer on a substrate; and
separating the template from the adhesion layer.

30. The method of claim 29, further comprising curing the adhesion layer before separating the template from the adhesion layer.

31. The method of claim 30, wherein curing the adhesion layer comprises heating the adhesion layer.

32. The method of claim 30, wherein curing the adhesion layer comprises applying light to the adhesion layer.

33. The method of claim 1, further comprising forming a plurality of the deterministically shaped first conducting polymer nanostructures above a plurality of first electrodes of the template, wherein the plurality of the deterministically shaped first conducting polymer nanostructures are formed concurrently.

34. The method of claim 1, further comprising forming a plurality of the deterministically shaped second conducting polymer nanostructures above a plurality of second electrodes of the template, wherein the plurality of the deterministically shaped second conducting polymer nanostructures are formed concurrently.

35. The method of claim 1, further comprising:
forming a plurality of the deterministically shaped first conducting polymer nanostructures above a plurality of first electrodes of the template, wherein the plurality of the deterministically shaped first conducting polymer nanostructures are formed concurrently with one another; and
forming a plurality of the deterministically second conducting polymer nanostructures above a plurality of second electrodes of the template, wherein the plurality of the deterministically shaped second conducting polymer nanostructures are formed concurrently with one another.

* * * * *